United States Patent
Bar-on et al.

(10) Patent No.: US 11,567,948 B2
(45) Date of Patent: Jan. 31, 2023

(54) AUTONOMOUS SUGGESTION OF RELATED ISSUES IN AN ISSUE TRACKING SYSTEM

(71) Applicants: Atlassian Pty. Ltd., Sydney (AU); Atlassian Inc., San Francisco, CA (US)

(72) Inventors: Noam Bar-on, San Francisco, CA (US); Sukho Chung, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 410 days.

(21) Appl. No.: 16/370,627

(22) Filed: Mar. 29, 2019

(65) Prior Publication Data

US 2020/0210439 A1     Jul. 2, 2020

Related U.S. Application Data

(60) Provisional application No. 62/786,230, filed on Dec. 28, 2018.

(51) Int. Cl.
*G06F 16/2457* (2019.01)
*G06F 16/248* (2019.01)
*G06F 16/28* (2019.01)

(52) U.S. Cl.
CPC ...... *G06F 16/24578* (2019.01); *G06F 16/248* (2019.01); *G06F 16/285* (2019.01)

(58) Field of Classification Search
CPC . G06F 16/24578; G06F 16/285; G06F 16/248
See application file for complete search history.

(56) References Cited

U.S. PATENT DOCUMENTS

| | | | | |
|---|---|---|---|---|
| 8,527,811 | B2 * | 9/2013 | Gilbert | H04L 41/065 714/26 |
| 9,459,950 | B2 * | 10/2016 | Bhamidipaty | G06F 11/079 |
| 2014/0122691 | A1 * | 5/2014 | Simhon | H04L 41/064 709/224 |
| 2015/0032751 | A1 * | 1/2015 | Ting | G06F 16/285 707/738 |
| 2016/0124951 | A1 * | 5/2016 | Barker | G06F 16/3334 707/752 |
| 2018/0025361 | A1 * | 1/2018 | Ferrarons Llagostera | G06F 16/24578 705/304 |
| 2019/0095495 | A1 * | 3/2019 | Venkata Naga Ravi | G06F 16/24568 |
| 2019/0361760 | A1 * | 11/2019 | Krishnan | G06F 11/0769 |

OTHER PUBLICATIONS

Zhou et al., "Resolution Recommendation for Event Tickets in Service Management," IEEE Transactions on Network and Service Management, vol. 13, 4 (2016), 954-967.*

* cited by examiner

*Primary Examiner* — Ashish Thomas
*Assistant Examiner* — Jedidiah P Ferrer
(74) *Attorney, Agent, or Firm* — Brownstein Hyatt Farber Schreck, LLP

(57) ABSTRACT

An issue tracking system configured to determine similarity between issue content in an issue request issue content in a previously submitted issue record. Based on the similarity, the issue tracking system may determine a likelihood that a given issue is related to at least one additional issue. In response to a determination that likelihood exceeds a threshold, data can be extracted from the related issue to provide the user with a suggested supplemental issue request to be submitted to the issue tracking system.

20 Claims, 5 Drawing Sheets

AUTONOMOUS SUGGESTION OF RELATED ISSUES IN AN ISSUE TRACKING SYSTEM

CROSS-REFERENCE TO RELATED APPLICATIONS

This application is a nonprovisional of and claims the benefit under 35 U.S.C. § 119(e) of U.S. Provisional Patent Application No. 62/786,230, filed on Dec. 28, 2018, and entitled "Autonomous Suggestion of Related Issues in an Issue Tracking System," the contents of which are incorporated by reference as if fully disclosed herein.

TECHNICAL FIELD

Embodiments described herein relate to issue tracking systems and, in particular, to systems and methods for providing one or more issue report suggestions to a user of an issue tracking system.

BACKGROUND

An organization or individual can leverage an issue tracking system to document and monitor completion of work related to a project or goal. In many cases, however, processes of adding, editing, and/or otherwise updating issues tracked in a conventional issue tracking system may be unnecessarily time and resource consuming. For example, users of an issue tracking system may be periodically or regularly required to input duplicate or substantially identical data multiple times. The systems and techniques described herein may be used to help guide the user in the creation of issues by suggesting content or by providing issue templates that may be submitted to the system.

SUMMARY

Embodiments described generally reference issue tracking systems including a client device executing a client application. These embodiments further include a host service operably coupled to the client application of the client device. The host service includes a processor configured to: receive from the client application a first issue request; generate a first issue record in response to receiving the first issue request; determine a similarity score between the first issue record and a second issue record stored by the host service; access a database to identify one or more issue records related to the second issue record; generate one or more issue record templates from the one or more related issue records; populate the one or more issue request templates with data extracted from the first issue record; and transmit the one or more populated issue request templates to the client application.

Some embodiments described herein generally reference methods for operating an issue tracking system. Such methods can include the operations of: generating a first issue record in response to receiving an issue request from the client application; accessing a database to identify one or more issue records related to issues having content similar to the first issue record; generating one or more issue record templates from the one or more related issue records; populating the one or more issue request templates with data extracted from the first issue record; and transmitting the one or more populated issue request templates to the client application.

Some example embodiments are directed to an issue tracking system that is configured to receive issue requests and suggest subsequent requests based on a predictive model. The issue tracking system may include a client device executing a client application and a host service communicably coupled to the client application of the client device over a network. The host service may include a processor that is configured to perform the following functions. The host service may receive from the client application a first set of multiple issue requests. The host service may generate a first set of issue records in response to receiving the first set of multiple first issue requests. The host service may, using a predictive model, determine a similarity score between the first set of issue records and a second set of issue records that are stored by the host service. In response to the similarity score satisfying a similarity threshold, the host service may access a database to identify one or more seed issue records that are related to the second set of issue records. The host service may extract seed content from the one or more seed issue records. In some implementations, identifying the seed issue record comprises determining a likelihood that the seed issue record includes data that is relevant to the first set of issue records. The host service may transmit a suggested issue request to the client application based, at least in part, on the seed content. In some cases, the second set of issue records include a parent issue and the seed issue record is child issue that depends from the parent issue. The data extracted from the seed issue record may include at least one of: an issue category; an issue assignee; an issue reporter; or an issue priority.

In some cases, the host service is further configured to generate one or more issue request templates in response to identifying the one or more seed issue records and populate the one or more issue request templates with the seed content extracted from the seed issue record and first content from the first set of multiple first issue requests. The host service may transmit the one or more populated issue request templates to the client application.

The client device may be a first client device of a group of client devices. Each client device of the group of client devices may be coupled to the host service by the network. The second set of issue records may have been generated in response to issue requests transmitted from a second client device of the group of client devices.

In some implementations, determining the similarity score between the first set of issue records and the second set of issue records comprises at least one of: determining a semantic similarity between a first issue description extracted from the first set of issue records and a second issue description extracted from the second set of issue records; or determining that the first set of issue records and the second set of issue records share one or more issue tags or categories.

Some example embodiments are directed to a method for operating an issue tracking system to suggest one or more issues to a client application on a client device that is communicably coupled to the issue tracking system. A first set of issue records may be generated in response to receiving a first set of issue requests from the client application. A database may be accessed to identify a second set of issue records that have content similar to the first set of issue requests. A seed issue record of the second set of issue records may be identified and seed content may be extracted from the seed issue record. One or more issue request templates may be generated in response to identifying the seed issue record. The one or more issue request templates may be populated with the extracted seed data to produce one or more populated issue request templates. The one or more populated issue request templates may be translated to the client application. The issue tracking system may cause the display of data from the one or more populated issue request templates within the client application on the client device.

In some cases, the first set of issue requests is associated with a project, and identifying the seed issue records comprises determining a likelihood that the seed issue record is a relevant to the project. In some cases, identifying the second set of issue records includes: determining a similarity score between the first set of issue records and a parent issue record stored in the database. The seed issue record, in some cases, may be a child of the parent issue record stored in the database.

In some embodiments, determining the similarity score between the first set of issue records and the parent issue record comprises at least one of: determining a semantic similarity between a first issue description extracted from the first set of issue records and a second issue description of the parent issue record; or determining that the first set of issue records and the parent issue record share one or more issue tags or categories.

In some cases, the issue tracking system comprising populating the one or more issue request templates with the data extracted from the first set of issue requests. In some cases, the client application is configured to receive an acceptance from a user of the one or more populated issue request templates, and the client application is configured to transmit one or more subsequent issue requests that are based on the one or more populated issue request templates.

In some cases, issue records from the first set of issue records include: an issue category; an issue assignee; an issue reporter; and an issue description.

Some example embodiments are directed to an issue tracking system for suggesting one or more issues to a client application on a client device that is communicably coupled to the issue tracking system. The issue tracking system may include a host service, and a database communicably coupled to the host service. The host service may be configured to: generate a first issue record in response to receiving an issue request from the client application on the client device; identify a second issue record having a similarity score relative to the first issue record that satisfies a threshold; access the database to identify a third issue record related to the second issue record; generate an issue request template from the third issue record; populate the issue request template with data extracted from one of the first issue record and the third issue record; and transmit the populated issue request template to the client application.

In some cases, the client application is configured to display the populated issue request template. The client application may be configured to receive additional issue data from a user to complete the populated issue request. The client application may be configured to generate a subsequent issue request based on the completed populated issue request. In some cases, the host service is configured to modify the threshold in response to receiving the subsequent issue request.

In some implementations, the first issue request is associated with a first project. Identifying the third issue record comprises determining a likelihood that the third issue record includes data that is relevant to the project. In some cases, the similarity score is determined based on a semantic similarity between a first issue description of the first issue record and a second issue description of the second issue record. In some cases, the similarity score is based on a determination that the first issue record and the second issue record share one or more issue tags or categories.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
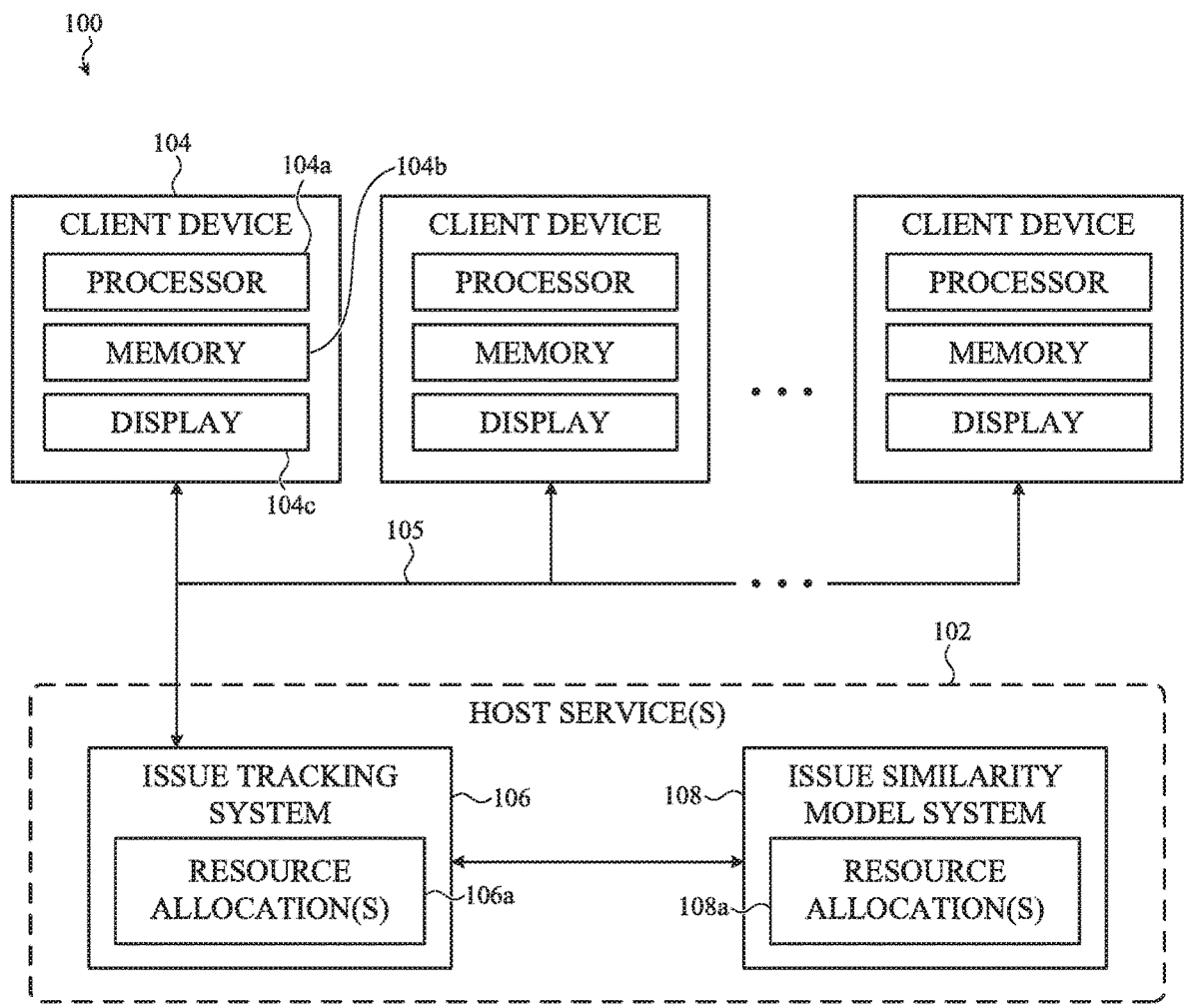
FIG. 1 is a schematic representation of an issue tracking system, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for suggesting tickets or issue requests for a user that is entering a series of issue requests to an issue tracking system. The systems and methods described herein may be particularly useful when initiating a series of issue requests that correspond to a type of project or set of tasks that typically includes multiple issues that are casually linked or otherwise related. In some instances, as described herein, the embodiments may be directed to systems and methods of determining a likelihood that an issue request submitted by a user to an issue tracking system is related to one or more previously submitted issue records stored by the system. If the determined likelihood satisfies a threshold, the system provides a suggestion to that user—based on the predicted relationship to at least one additional issue request—to submit one or more additional issue requests. In some cases, the issue suggestion is provided based on an established explicit relationship between two issue requests or issue records. The explicit relationship may be a dependency where one issue must be completed before another issue or may be generally described as having a parent-child relationship. As a result of these and other constructions and architectures described herein, related issue requests can be provided in batches to an issue tracking system in a substantially more time-efficient and resource-efficient manner.

An issue tracking system, as described herein, may be used to refer to a project management tool that may be specially configured for tracking issues and tasks that are associated with a software development project. As described herein, an issue tracking system may be used to refer to a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In many examples, an issue tracking system is configured for use by a software development team to track completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; and so on.

For purposes of the following disclosure, the terms "issue report," "issue," and "ticket" may be use to generally refer to an issue or item that is being tracked by the system. More specifically, the term "issue request" is generally used to describe input provided by a user to an issue tracking system that may result in a creation of an "issue record." As used herein, the term "issue record" may be used to refer to a discrete database record associated with an issue or item being tracked by an issue tracking system. Although not required, an issue record can be stored, at least temporarily, in a database accessible to an issue tracking system. While these terms are used herein with respect to specific examples and potential implementations, it may be appreciated that these are merely examples and other embodiments can be configured to receive, anticipate, predict and/or recommend additional or alternative data, user inputs, or issue requests or issue records associated with an issue tracking system.

More specifically, an issue tracking system—such as described herein—can initially be configured to monitor, track, or otherwise analyze issue records having defined relationships to other issue records in order to train or update a predictive model. In this manner, a predictive model, such as described herein, can be configured to determine a statistical likelihood that a given issue request or issue record is related to at least one other issue request or issue record that has been previously submitted and using the related issue record to suggest the creation of a new issue to the user.

Once a predictive model—such as described herein—is suitably trained, it can be leveraged by an issue tracking system to determine a likelihood that a particular issue request, submitted by a user is or is not expected to be related to at least one other issue record previously submitted or created by the system. If the determined likelihood satisfies a threshold (predetermined, variable, or otherwise), the issue tracking system can generate a suggestion to the user to submit one or more additional, related, issue requests. In many examples, the suggested additional issues can be prepopulated with content extracted from the issue request submitted by the user (e.g., project, epic, story, reporter, assignee, categorization, and the like) in addition to content extracted from one or more preexisting issue records. In this manner, the time required to enter multiple discrete related issues in sequence can be dramatically reduced, substantially improving the user experience of interacting with an issue tracking system.

These foregoing and other embodiments are discussed below with reference to FIGS. 1-4. However, those skilled in the art will readily appreciate that the detailed description given herein with respect to these figures is for explanatory purposes only and should not be construed as limiting.

FIG. 1 is a schematic representation of an example issue tracking system. In the illustrated embodiment, the issue tracking system 100 is implemented with a client-server architecture including a host service 102 that communicably couples (e.g., via one or more networking or wired or wireless communication protocols) to one or more client devices, one of which is identified as the client device 104. It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application may be configured to produce a graphical user interface having a set of fields or other template for receiving user input regarding an issue request or ticket. The client application is configured to access and communicate with the host service 102 and to securely transact information or data with, and provide input(s) to, the host service 102. In some embodiments, the client application may be a browser application configured to access a web page or service hosted by the host service 102 that is accessible to the client device 104 over a private or public network that may, in some embodiments, include the open internet.

In many embodiments, the host service 102 is configured to operate within or as a virtual computing environment that is supported by one or more physical servers including one or more hardware resources such as, but not limited to (or requiring) one or more of: a processor; a memory; non-volatile storage; networking connections; and the like. As used herein, a processor of the host service 102 may refer one or more physical processors or processing units implemented on one or more physical computing system that, alone or together, can be configured to implement the functionality described herein. The host service 102 may be implemented on a single computing system or using a distributed network of computing systems. For simplicity of description and illustration, the various hardware configurations associated with a processor, computing device, or hardware architecture are not shown in FIG. 1.

In many embodiments, the host service 102 can include a number of discrete subservices or purpose-configured modules, containers, or virtual machines each configured to perform, coordinate, serve, or otherwise provide one or more services, functions, or operations of the host service 102, such as the operations of determining or inferring one or more patterns in issue reporting, comparing issue requests to previously-received issue requests or records, determining a likelihood that an issue request or an issue record is related to another issue request or an issue record, and so on.

To facilitate these operations, the host service 102 includes an issue tracking server 106 configured to receive issue requests from the client device 104 via the network 105. As noted with respect to other embodiments described herein, as an issue request—and/or portions thereof—is received from the client application 104a executed by the client device 104, the issue tracking server 106 can communicate with a predictive model server 108 that is trained to perform an analysis on the issue request received by the issue tracking server 106 to determine a likelihood of that the issue request should have a dependent issue or task that can be suggested by the predictive model server 108. In some instances, the issue tracking server 106 is configured to determine a likelihood of whether another issue record that has been previously submitted has data or information that may be relevant to the issue request. In some instances, the issue tracking server 106 is configured to determine a likelihood of whether another issue record that has been previously submitted is representative of a dependent or related issue that should be suggested to the user.

As noted with respect to other embodiments described herein, the predictive model server 108 of the host service 102 can be trained, updated, and/or configured by analyzing a set of issue records that correspond to a set of issue requests received by the issue tracking system 100 and, in particular, the issue tracking server 106.

The set of issue records used to train the predictive model server 108 can contain both issue records that have no relationship to other issue records and issue records that do have relationships to other issue records.

Iteratively or otherwise, the predictive model server 108 can consume user-supplied content (e.g., description, summary, title, categorization, project, team, assignee, reporter, and so on) associated with each issue record of a given set of previously-received issue records (in turn corresponding to a set of issue requests received by the issue tracking system 100) to assemble a database or corpus of issue record contents. More specifically, the predictive model server 108 can be configured, in many embodiments, to assemble two separate databases or corpuses—one in which issue record content is derived or otherwise obtained from issue records that are related to at least one other issue record and a second database or corpus in which issue record content is derived or otherwise obtained from issue records that are not related to at least one other issue record. In many cases, the data consumed by the predictive model server 108 can be supplied by the issue tracking server 106, but this may not be required.

Example issue records that can be supplied to the predictive model server 108 can include, but may not be limited to: previously opened issue records; previously closed issue records; issue records related to a project; issue records related to a particular user story (e.g., a narrative describing a desired feature or function); issue records related to a particular epic (e.g., a set of related user stories or functional themes); issue records related to a particular initiative (e.g., high-level functionality or design principles); issue records related to a particular company or company type (e.g., software development corporation, human resources corporation, project management corporation); and so on.

Data extracted from such issue records that can be consumed by the predictive model server 108 to train and/or define one or more operations of the predictive model server 108 can include, but may not be limited to: issue title; issue description; issue summary; issue links; issue relationships; issue dependencies; issue projects; issue tags, groups, clusters, or categorizations; and so on. The foregoing examples are not exhaustive and it may be appreciated that other data or content may be used by an issue tracking system, such as described herein, to train, update, and/or define one or more operations of the predictive model server 108.

Thereafter, the data consumed by the predictive model server 108 can be analyzed (and, optionally, normalized, lemmatized, segmented, or otherwise preprocessed) to determine whether statistical inferences can be derived therefrom. For example, in one embodiment, text content derived from, or otherwise obtained from, issue records known to be related to at least one other issue record can be segmented by words, phrases, or sentences to determine which content occurs most frequently. In many examples, text content from, or otherwise obtained from, issue records known not to be related to at least one other issue record can be likewise segmented by words, phrases, or sentences to determine which content occurs most frequently.

In this manner, a database of terms and phrases (collectively, herein "keywords") can be created in which certain keywords used in an issue request or report are associated with a statistical likelihood that a related issue request or report may exist and certain other keywords used in an issue request or report are associated with a statistical likelihood that no related issue exists.

For example, in one embodiment, data consumed by the predictive model server 108 can be analyzed to determine that the keyword "update localization strings" is known to not be associated with any related issue requests or reports whereas the keyword "integrate third-party API" is known to be associated with at least one related issue request or report.

In still further examples, data consumed by the predictive model server 108 can be analyzed in a different manner to further train or define a behavior of the predictive model server 108; for example, in some embodiments, one or more topic modeling operations (e.g., Latent Dirichlet Allocation operation(s), Non-negative Matrix Factorization operation(s) and so on). In this example, clusters of (optionally, lemmatized) words or phrases related to a particular topic model or other semantic structuring can be added to a database and flagged as associated with issue requests or reports known to be associated with at least one other issue request or report or, alternatively, associated with no other issue requests or reports.

It may be appreciated that the foregoing is not exhaustive; the predictive model server 108 can be trained and/or defined or configured to operate in any suitable manner. In many cases however, the predictive model server 108—such as described herein—is trained by consuming historical issue record data stored in the issue tracking system 100.

Further, it may be appreciated that any number of historical issue records can be used and/or consumed by the predictive model server 108 in the course of training the same. Alternatively, any appropriate set or subset of issue records can be consumed.

Example sets of issue records that can be used to train the predictive model server 108 can include (without limitation): all issue records stored by the issue tracking system 100, regardless of client, epic, story, project, group, or otherwise; only issue records associated with a particular client or business; only issue records associated with a particular client or user type (e.g., large-cap companies, small-cap companies, software development companies, human resources companies, and so on); only issue records associated with a particular group of users (e.g., a particular software development group); only issue records associated with a particular project; only issue records associated with a particular product platform (e.g., Apple iOS® software project or Google Android® software product); and so on.

The preceding examples are not exhaustive; it may be appreciated that in some embodiments, training data supplied to, and consumed by, the predictive model server 108 can be limited, curated, or otherwise tailored in any suitable manner. Alternatively, training data can be entirely unlimited and may span different users, different instances of different issue tracking systems, and so on. In different embodiments, different training data—or sets of training data—may be appropriate, preferred, or otherwise used.

For example, as noted above, the predictive model server 108 can be configured to consume content of an issue request as the content is being entered by a user. More specifically, as a user enters content to an issue request form (e.g., displayed by the display 104c of the client device 104) prior to submitting the issue request to the issue tracking system 100, the partially-complete issue request content entered by the user can be received by the issue tracking system 100. In response, the predictive model server 108 can extract keywords, perform a text normalization operation (e.g., sentence segmentation, lemmatization, stop word removal, and so on), and/or perform one or more topic modeling operations.

Thereafter, the predictive model server 108 can compare the resulting keywords, normalized text, and/or topic models (collectively, herein "extracted features") to the previously-generated database(s) of keywords, text, and/or topic models known to be associated with issue records having express relationships to other issue records (collectively, herein "relationship-signaling features").

Optionally, the predictive model server 108 can also compare the features extracted from the partially-complete issue request content to the previously-generated database(s) of keywords, text, and/or topic models known to not be associated with issue records having express relationships to other issue records (collectively, herein "relationship-disqualifying features").

The predictive model server 108 can compare extracted features to relationship-disqualifying features and relationship-signaling features in any number of suitable ways. Examples include, but are not limited to, calculations and/or operations to determine: Levenshtein distance; cosine similarity calculation; Manhattan distance calculation; semantic similarity; lemmatized string similarity; term frequency comparison; document or field term frequency comparisons; Jaro-Winkler distance; Jaccard similarity; and the like. In many cases, a comparison leveraged by the predictive model server 108 can output a similarity value or score that can be compared against a similarity threshold to determine whether an extracted feature is sufficiently similar to a relationship-signaling feature and/or a relationship-disqualifying feature. It may be appreciated that such similarity thresholds can vary from embodiment to embodiment and from comparison technique or method to comparison technique or method. For example, a similarity threshold related to a Levenshtein distance calculation may be different from a similarity threshold related to a cosine similarity calculation.

Once a determination is made by the predictive model server 108 that a particular extracted feature is sufficiently similar to one or more relationship-signaling and/or relationship-disqualifying features, the predictive model server 108 can determine and output a statistical confidence or value that corresponds to a likelihood that the issue request submitted by the user is, or will be, related to another issue record or issue request. The likelihood may provide an indication that the related issue record, seed issue record, or issue request may be appropriate for suggestion to the user as a follow-on task or issue. In some cases, the related issue record, seed issue record, or issue request may indicate an issue or task that should precede or is a suggested prerequisite to the issue request currently being submitted to the system.

Thereafter, the determined likelihood can be compared to a confidence threshold. Upon determining that the determined likelihood output from the predictive model server 108 satisfies the confidence threshold—which may vary from embodiment to embodiment—the issue tracking system 100 can provide a recommendation to the user (e.g., via communication with the client device 104 over the network 105) to submit an additional issue request (or more than one issue request) that is related to the initial issue request submitted by that same user.

In further examples, the predictive model server 108 can leverage the database of relationship-signaling features to automatically prepopulate one or more fields or contents of a suggested issue request to a user of the issue tracking system 100.

For example, a user of the issue tracking system 100 can initiate an issue request or series of issue requests by entering a description of a newly-discovered bug in a software product into a text field of a graphical user interface presented by the display 104c of the client device 104 in communication with the host service 102. As the user continues to provide input, the issue tracking server 106 can provide the content(s) entered by the user to the predictive model server 108. In response, the predictive model server 108 may extract the keywords "bug" and "confidential" and can generate a topic model including a cluster of words generally related to customer data privacy. In this example, the predictive model server 108 may determine that the extracted keyword "bug" is semantically related to (e.g., having a similarity score satisfying a similarity threshold) a known relationship-signaling keyword of "error" and, additionally, that the extracted topic model is related (e.g., having a similarity score satisfying a similarity threshold) to a relationship-signaling topic model including a cluster of words related to data privacy. Optionally, the predictive model server 108 may determine that no extracted feature corresponds to, or is otherwise associated with, any relationship-disqualifying feature. This analysis may be repeated for a set of issue requests that are being entered and/or performed on content extracted from multiple issue requests.

Based on the determination that two-thirds of the features (or some other threshold) extracted from the issue request content(s) supplied by the user correspond to a relationship-signaling feature, and that none of the features extracted from the issue request correspond to a relationship-disqualifying feature, the predictive model server 108 may determine a 66% likelihood that the issue request being entered by the user is, or will be, related to another issue record or issue request. For example, the predictive model server 108 may be able to identify a second set of issue records that have a similarity (satisfy a similarity score or similarity threshold) to one or more of a first set of issue request that are being entered by the user. In some cases, the second set of issue records has a parent task with an explicit relationship to a child task. The child task may be identified as the seed issue request or as containing seed issue request content.

In some implementations, the issue tracking system 100 (and/or the predictive model server 108) can thereafter decide whether the determined likelihood of 66% satisfies a confidence threshold. Independent of the confidence threshold value selected for the implementation supporting this example, upon determining that the likelihood satisfies the threshold, the issue tracking system 100 can update the graphical user interface to suggest that the user begin entering data for another issue request after the user submits the initial issue request. For example, the issue tracking system 100 can modify the text of a "submit issue request" button to "submit issue request and add related issue." In other cases, other modifications to the graphical user interface, or means of notifying the user of the recommendation to add additional related issues, may be used.

In still further examples, the predictive model server 108 and/or the issue tracking system 100 may provide to the user a more specific or granular recommendation based on the relationship-signaling features determined to be similar to the extracted features of the issue request entered by the user.

For example, (optionally) after determining that an issue request is likely to be related to another issue (e.g., a seed issue), the predictive model server 108 and/or the issue tracking system 100 can leverage an issue record history or issue report history to determine content (e.g., title, description, keywords, and so on) that can be suggested to the user. For example, the predictive model server 108 may determine that the issue request entered by the user may be determined to be substantially similar (e.g., via a semantic similarity comparison, a document similarity comparison, and the like) to another issue in the same or a different project previously entered by that user or another user. After identifying the previously-entered similar issue (e.g., seed issue), the predictive model server 108 and/or the issue tracking system 100 can extract one or more features (e.g., seed content) from the previously-entered similar issue and can provide those extracted issues to the user as a suggestion.

In other examples, the database(s) of relationship-signaling features and/or relationship-disqualifying features can include information that causally and/or logically links different features to one another. In this manner, if the predictive model server 108 determines a similarity between an extracted feature and a relationship-signaling feature stored in the database, the issue tracking system 100 can leverage the content of the relationship-signaling feature, in addition to any and all other relationship-signaling features related to that feature, in order to determine content that can be suggested to the user.

For example, in one embodiment, a user enters content via the client device 104 from which the predictive model server 108 extracts a number of features (e.g., keywords, topic models, and so on). One or more of the extracted features can be compared to a database of relationship-signaling features and/or to a database of relationship-disqualifying features. In response, the predictive model server 108 may determine that a majority, plurality, or statistically significant sample size of extracted features each correspond to at least one relationship-disqualifying feature. In this example, the predictive model server 108 can output to the issue tracking server 106 and/or another component of the host service 102 of the issue tracking system 100 a value corresponding to a low statistical confidence that the content entered by the user is, or will be, related to any other issue record or request. Alternatively, the value output by the predictive model server 108 can correspond to a high statistical confidence that the content entered by the user is not, and will not be, related to any other issue record or request. In response to either example, the issue tracking system 100 may refrain from providing a recommendation to the user to submit additional issues.

In another example, a user enters content via the client device 104 from which the predictive model server 108 extracts a number of features. As with the preceding example, one or more of the extracted features can be compared to a database of relationship-signaling features and/or to a database of relationship-disqualifying features. In response, the predictive model server 108 may determine that a majority, plurality, or statistically significant sample size of extracted features each correspond to at least one relationship-signaling feature. In this example, the predictive model server 108 can output to the issue tracking server 106 and/or another component of the host service 102 of the issue tracking system 100 a value corresponding to a high statistical confidence that the content entered by the user is, or will be, related to any other issue record or request, which may be used as a seed issue record or used to extract seed content. Alternatively, the value output by the predictive model server 108 can correspond to a low statistical confidence that the content entered by the user is not, and will not be, related to any other issue record or request. In response, the issue tracking system 100 may provide a recommendation to the user to submit additional issues. The recommendation may include seed content extracted from the identified issue record or issue request. In some cases, the recommendation includes a suggestion to create a new issue request having a particular title or subject matter. Extracted content may or may not be transmitted to the user as part of the recommendation.

In another example, a user enters content via the client device 104 from which the predictive model server 108 extracts a number of features. As with the preceding examples, one or more of the extracted features can be compared to a database of relationship-signaling features and/or to a database of relationship-disqualifying features. In response, the predictive model server 108 may determine that none of the extracted features correspond to any relationship-signaling feature or to any relationship-disqualifying feature. In this example, the predictive model server 108 can output to the issue tracking server 106 and/or another component of the host service 102 of the issue tracking system 100 a value corresponding to a low statistical confidence that the content entered by the user is, or will be, related to any other issue record or request. Alternatively, the value output by the predictive model server 108 can correspond to a low statistical confidence that the content entered by the user is not, and will not be, related to any other issue record or request. In response to either example, the issue tracking system 100 may refrain from providing a recommendation to the user to submit additional issues.

In another example, a user enters content via the client device 104 from which the predictive model server 108 extracts a number of features. As with the preceding example, one or more of the extracted features can be compared to a database of relationship-signaling features and/or to a database of relationship-disqualifying features. In response, the predictive model server 108 may determine that a majority, plurality, or statistically significant sample size of extracted features each correspond to at least one relationship-signaling feature. In this example, the predictive model server 108 can output to the issue tracking server 106 and/or another component of the host service 102 of the issue tracking system 100 a value corresponding to a high statistical confidence that the content entered by the user is, or will be, related to any other issue record or request. Alternatively, the value output by the predictive model server 108 can correspond to a low statistical confidence that the content entered by the user is not, and will not be, related to any other issue record or request. In response, the issue tracking system 100 may provide a recommendation to the user to submit additional issues. In addition, in this example, the issue tracking system 100 can be further configured to provide the recommendation to the user to submit an additional issue with prepopulated content based on the content already entered by the user via the client device 104. Such content can include, but may not be limited to: issue project; issue reporter; issue tags; issue priority; issue categorization; and the like. The recommendation may also include seed content that is extracted from the identified issue record or issue request.

In still further examples, an issue tracking system 100 can be further configured to compare an issue request, or set of multiple issue requests, received from a user to previously-received issue requests (stored as issue records). More specifically, the predictive model server 108 and/or the issue tracking server 106 can be configured to compare an issue or issues entered by the user to all or a subset of issue records tracked by the issue tracking system 100. Upon determining that an issue record or set of issue records is similar to (e.g., a similarity value beyond a similarity threshold) the issue request or set of requests submitted by the user, the predictive model server 108 and/or the issue tracking server 106 can determine whether the identified issue record is causally or logically related to other issue records. Upon determining that the identified issue record is related to other issues tracked by the issue tracking system 100, the issue tracking system 100 can provide a recommendation to the user to submit additional issues, each recommended issue having content corresponding to the issue records related to the identified issue record determined to be similar to the issue request entered by the user.

It may be appreciated that the foregoing examples are not exhaustive. More generally and broadly, it is appreciated that the issue tracking system 100, and in particular the predictive model server 108 of the issue tracking system 100, can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical or causal relationships between, different issues, different issue content, successions or sequences of issues, or groups of issues reported to the issue tracking system 100.

More generally, it may be appreciated that the issue tracking system 100 may be configured to detect, define, determine, or otherwise infer one or more patterns, relationships, relationship-signaling features, and/or relationship-disqualifying features in, without limitation: a history or log of issues reported to the system for a particular project or epic and/or categorized or grouped in a particular manner; the time between reports of different issues having similar categorization; text content of one or more issues reported to the system; issues reported by or assigned to a particular user of the system; issues related to a particular task or story associated with a particular project tracked by the system; and the like.

It may be appreciated, however, that the foregoing examples are not exhaustive and that any suitable means of determining a pattern or other logical or causal link between two or more issues can be used. For simplicity of description, these operations are described herein as operations to detect a pattern in, or apply machine learning to, issues previously reported to the issue tracking system 100. The system can leverage any detected patterns in issue reporting in particular projects or having particular categorizations to, among other actions, suggest and/or autonomously duplicate (with or without modification) issues in other projects or for the benefit of other users of the same or a different issue reporting system.

In one general example, upon detecting a pattern that a first issue is opened prior to a second issue in the same project, the issue tracking system 100 may define (e.g., create an entry in a database) a causal relationship or other association between the first issue and the second issue. The causal relationship may be related to a dependency between the issue records or may be determined or learned from prior activity. In some cases, the dependent issue is designated as a child issue to the other issue, which may be designated as a parent issue. In one example, the issue tracking system 100 may use a history of existing issue records to identify reoccurring sequences or groupings of issue records that may indicate a causal relationship.

As a result of this determined or defined causal relationship, when a user submits an issue request that is determined, by the issue tracking system 100, to be similar to the first issue of the preceding example, the issue tracking system 100 may anticipate or predict that the user also intends to—or would otherwise be advised to—open another issue substantially similar to the second issue of this example. In response, the issue tracking system 100 can generate a suggestion and display or otherwise transmit that suggestion to a user of the issue reporting system 100 to submit another issue having properties and contents substantially similar to the second issue of the preceding example.

As noted above, in these example embodiments, the issue tracking system 100 can be configured to leverage any suitable similarity or classification algorithm, probabilistic model, machine learning technique (whether trained or untrained), artificial intelligence method, or any suitable combination thereof, to compare issues to one another to determine similarities therebetween. Examples include, but are not limited to: determining cosine distance or similarity of content of two or more issues; determining Jaccard similarity of content of two or more issues; determining Euclidean or Manhattan distance between content of two or more issues; determining semantic similarity of text content of two or more issues; and the like.

Example content of an issue (e.g., issue request and/or issue record) that can be compared in the course of determining whether two issues are similar can include, but may not be limited to: issue description; issue summary; project name; issue type; a name or identity of a user who reported the issue; a name or identity of a user assigned to the issue; a priority of the issue; one or more labels, tags, or categories of the issue; one or more linked issues; one or more epic links; one or more user story links; and the like.

In some embodiments, as noted above, the issue tracking system 100 can also prepopulate content of a suggested issue based on content or data of one or more previously reported issues. In this manner, as a user provides one or more issue requests to the issue tracking system 100, one or more suggestions of additional issues, which may already include relevant and/or prepopulated data or content, can be presented to that user for consideration.

Additionally, as noted above, the issue tracking system 100 can be configured to leverage one or more detected patterns across multiple discrete projects tracked by the same issue tracking system 100.

Additionally, the issue tracking system 100 can be configured to provide suggestions of issues to be opened only if certain conditions are satisfied. For example, the issue tracking system 100 may be configured to suggest issues to be opened only if a similarity metric, score, or estimation exceeds a threshold or a particular value. In some cases, the threshold may be dynamically adjusted based on feedback received from the user or other users. For example, if one or more users have previously accepted an issue suggested by the issue tracking system, a dynamic threshold may be lowered or increased in response. In some cases, the issue tracking system 100 may be configured to withhold suggestions if only one suggested issue can be provided. Alternatively, the issue tracking system 100 may be configured to withhold suggestions if the system determines that a high number of issues are potentially related.

Additionally, the issue tracking system 100—such as described herein—can be triggered to detect patterns in issue reporting by a variety of stimuli including, for example, a series of user inputs that may include multiple issue requests. For example, in some embodiments, the issue tracking system 100 initiates an operation to detect a pattern in issue reporting in response to a new issue being reported to a particular project. In other cases, the issue tracking system 100 initiates an operation to detect a pattern in issue reporting each time (e.g., in response to) a new issue is reported with a particular tag, categorization, title, or other specified content. In other cases, the issue tracking system 100 initiates an operation to detect a pattern in issue reporting each time a new issue is reported with a particular tag, categorization, title, or other specified content.

In still other examples, the issue tracking system 100 initiates an operation to detect a pattern in issue reporting in response to direct input from a user. In still other examples, the issue tracking system 100 initiates an operation to detect a pattern in issue reporting and/or to update training of the predictive model server 108 at a regular interval (e.g., every fifteen minutes, every hour, every day, every week, and so on); any suitable interval may be used.

Additionally, the issue tracking system 100 can be triggered to determine whether one or more suggestions can be made based on a previously-detected pattern of issue reporting in response to a variety of stimuli. For example, in some embodiments, the issue tracking system 100 initiates an operation to detect whether one or more suggestions can be made in response to a new issue being reported to a particular project.

In other cases, the issue tracking system 100 initiates an operation to detect whether one or more suggestions can be made each time (e.g., in response to) a new issue is reported with a particular tag, categorization, title, or other specified content. In other cases, the issue tracking system 100 initiates an operation to detect whether one or more suggestions can be made each time a new issue is reported with a particular tag, categorization, title, or other specified content.

In other examples, the issue tracking system 100 initiates an operation to detect whether one or more suggestions can be made in response to direct input from a user. In other examples, the issue tracking system 100 initiates an operation to detect whether one or more suggestions can be made at a regular interval (e.g., every fifteen minutes, every hour, every day, every week, and so on); any suitable interval may be used.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent, to one skilled in the art, that some of the specific details presented herein may not be required in order to practice a particular described embodiment, or an equivalent thereof.

For example, the issue tracking system 100 of FIG. 1 can be implemented in a number of suitable ways. As illustrated, the host service 102 includes one or more purpose-configured modules or components each configured to perform a discrete task associated with the operation of the issue tracking system 100.

In particular, as noted above, the host service 102 includes an issue tracking server 106 and a predictive model server 108. It may be appreciated that although these functional elements are identified as separate and distinct "servers" that each include allocations of physical or virtual resources (identified in the figure as the resource allocations 106a and 108a, respectively)—such as one or more processors, memory, and/or communication modules (e.g., network connections and the like)—that such an implementation is not required. More generally, it may be appreciated that the various functions described herein of a host service 102 can be performed by any suitable physical hardware, virtual machine, containerized machine, or any combination thereof.

In the illustrated example, the issue tracking server 106 of the host service 102 can be configured to manage and maintain a record of issues reported in one or more projects tracked by the issue tracking system 100. In addition, the issue tracking server 106 of the host service 102 can be configured to communicably couple to the client device 104 via the network 105 in order to exchange information with and/or receive input(s) from the client device 104 in the course of tracking and/or documenting progress of completion of one or more issues of one or more projects tracked by the issue tracking system 100.

Information or data related to projects tracked by the issue tracking system 100, such as a codebase of a software development project, can be stored, in many embodiments, in a database managed by a repository server (not shown), which can be communicably and securely coupled to the issue tracking server 106. The repository server may be used to store or maintain a repository of issue records, issue record groups, issue record clusters, and/or other data related to the creation and maintenance of issues. The database(s) managed by the repository server can be implemented with any suitable known or later developed database or digital information storage technology or technique. In many examples, the repository server is configured to track and maintain a record of changes made to data or information stored in the database(s) managed by the repository server, but this may not be required.

In many examples, the issue tracking server 106 can be configured to receive, over the network 105, from the client device 104 (e.g., via user input provided through a graphical user interface rendered on the display 104c, provided by the client application, or any combination thereof), an issue request.

The issue request may include, by way of example, a request to open, create, or report an issue in a particular project; a request to modify an existing issue; a request to close an existing issue; a request to link an existing issue to another issue; a request to assign an issue to a particular user; a request to initiate an operation to detect one or more patterns of issue reporting (such as described herein); a request to initiate an operation to determine whether two or more issues are related; and the like. In some examples, in response to information or requests received from the client device 104, the issue tracking server 106 can submit a request to the repository server to add, modify, or delete data stored in one or more databases managed by the repository server.

In addition, the client device 104—and in particular, the client application executed by the client device 104—can be configured to receive, over the network 105, from the issue tracking server 106, without limitation: a suggestion of an issue to be opened in a particular project; a notification that one or more suggestions of issues to be opened are available for consideration; a request to provide information related to a particular issue; a request to confirm whether two issues, projects, or categorizations of issues are related or equivalent; and so on.

As such, generally and broadly, it may be appreciated that an issue tracking system, such as described herein, can perform multiple determinations and/or may make multiple suggestions to a user based on content entered by that user in the course of interacting with the system. For example, in some cases, an issue tracking system may make a single determination of whether an issue request being entered by a user is likely to be related to another issue. In response to making this determination, the issue tracking system can suggest to the user that the user enter another issue related to the first issue. In other examples, an issue tracking system may make a two-step determination that includes (1) determining whether an issue request (or set of issue requests) being entered by a user is likely to be related to another issue (or set of issue records) and (2) determining whether the issue request(s) being entered by the user is sufficiently similar to one or more previous issues received by the system. In response to these determinations, the system can make multiple suggestions to the user including, but not limited to: suggesting the user enter another issue after completing the first issue; suggesting content in the first issue (e.g., in a field already populated by the user or a field not yet populated by the user) based on one or more extracted features obtained from a previously-received or seed issue; suggesting content in a suggested new issue based on one or more extracted features obtained from a previously-received issue (which may be the same as or different from a previously-received issues used to optionally populate content in the first issue); suggesting the user enter another issue after completing the first issue, the other issue identified based on a determination that the first issue (being entered by the user) is similar to a previously-received issue that, in turn, has a relationship to another issue; and so on or any combination thereof.

Generally, an issue tracking system, as described herein, can be configured to leverage and/or otherwise ascertain relationships between content of issues and/or issues themselves in order to provide suggestions to a user of that system. The suggestions may be for content of the issue currently being entered by the user, for content of a subsequent (one or more) issue that may be opened by the user after the first issue is complete, for content of a separate issue not related to the first issue, and so on.

It may be appreciated that the foregoing examples are not exhaustive; more generally and broadly, it is appreciated the issue tracking server 106, the repository server, and the client device 104 can transact any suitable data or information, in any suitable form or format, across one or more communication channels or protocols, in a secure or encrypted manner, or in an unencrypted manner, and so on.

In view of the foregoing, it may be understood that the various descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
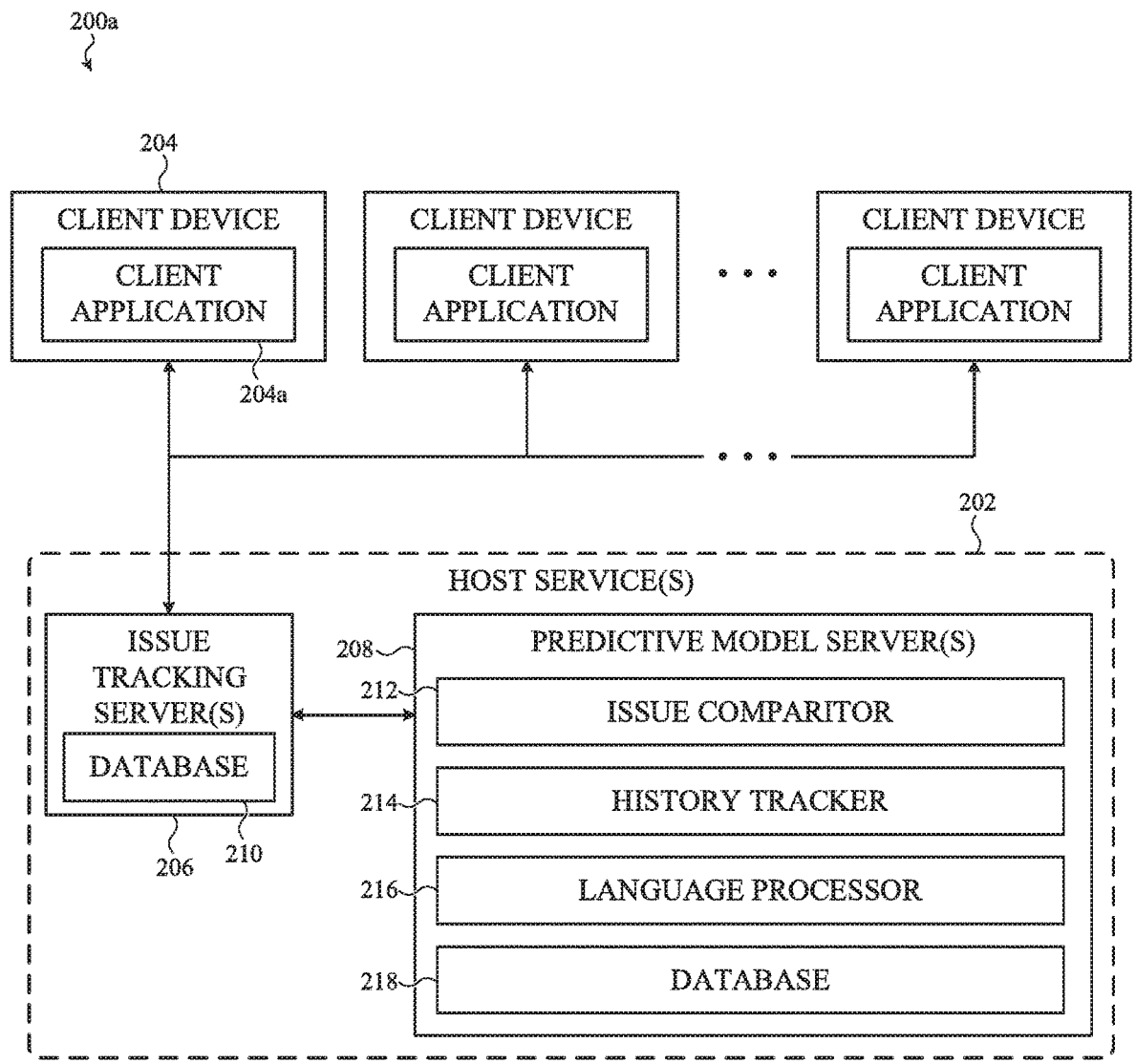
FIG. 2A is a system and signal flow diagram of an issue tracking system, such as described herein.

For example, FIG. 2A, depicts a system and signal flow diagram of an issue tracking system, such as described herein. The issue tracking system 200a can be configured, both physically and operationally, in the same manner as the issue tracking system 100 described in reference to FIG. 1 and this description is not repeated.

The issue tracking system 200a can include a host service 202 configured to communicate with one or more client devices, one of which is identified as the client device 204. As with other embodiments described herein, the client device 204 can be configured to execute a client application 204a that is configured to transact information and data with the host service 202. The client application 204a provides a graphical user interface to facilitate interaction between the issue tracking system 200a and a user of that system.

The host service 202 includes an issue tracking server 206 that is communicably coupled to a predictive model server 208. As with other embodiments described herein, the issue tracking server 206 can include a database 210 or issue record repository that is configured to store information related to issues reported and closed for projects tracked by the issue tracking system 200a.

As with other embodiments described herein, the host service 202 also includes the predictive model server 208. In the illustrated embodiment, the predictive model server 208 can include a number of discrete subservices or purpose-configured modules, containers, or virtual machines each configured to perform, coordinate, serve, or otherwise provide one or more services, functions, or operations of the predictive model server 208. More particularly, the predictive model server 208 can include an issue comparator 212, an issue history tracker 214, a language processor 216, and a database 218.

The issue comparator 212 of the predictive model server 208 can be configured in any suitable manner to implement the operation of comparing one or more issues for similarity. As noted above, this operation can be performed in a number of ways. An example method by which two issues can be compared includes comparing the text content of each issue to one another. For example, issue descriptions can be compared using any suitable text comparison technique.

The issue history tracker 214 of the predictive model server 208 can be configured in any suitable manner to implement or otherwise perform the operation of inferring issue reporting patterns and/or extracting features from a given input issue record to create relationship-signaling features and/or relationship-disqualifying features (e.g., to update training of the predictive model server 208). More specifically, in one example, the issue history tracker 214 can be configured to monitor and/or analyze the time and sequence in which various associated issues (e.g., issues in the same project, issues having the same categorization, and so on) were reported. In addition, the history tracker 214 can be configured to monitor and/or analyze the content and extractable features of issue records reported to the system 200a.

The language processor 216 of the predictive model server 208 can be configured in any suitable manner to implement or otherwise perform the operation of providing natural language processing and/or analysis of content of one or more issues or issue contents. In one example, the language processor 216 can be leveraged by the issue comparator 212 to compare the text content of two or more issues.

In another example, the language processor 216 can be leveraged by the issue history tracker 214 in the course of determining or detecting one or more patterns of issue reporting. It may be appreciated that the language processor 216 may be suitably configured for purpose-agnostic natural language processing and/or text or string comparisons.

The database 218 or issue record repository of the predictive model server 208 can be configured in any suitable manner to implement or otherwise perform the operation of recording one or more detected patterns of issue reporting and/or extracted or detected relationship-signaling features and/or relationship-disqualifying features. The database 218 can be accessed by any module or component of the predictive model server 208 at any suitable time to determine whether a particular issue matches and/or otherwise corresponds to a previously-detected pattern of issue reporting and, additionally, to determine whether content of a reported issue is related to one or more relationship-signaling features and/or relationship-disqualifying features.

It may be appreciated that the foregoing simplified examples are not exhaustive of the various possible components, systems, servers, and/or modules that may be used by an issue tracking system, such as described herein. Accordingly, more generally and broadly, it may be appreciated that an issue tracking system, such as described herein, can be configured to receive an issue request from a user, compare those issue requests or records to previously-detected issue requests, records or issue reporting patterns, and provide recommendations of additional actions that can be taken by the user based on a determined similarity between the newly-received issue request and one or more previously reported issues or one or more previously-detected issue reporting patterns.

Figure 2B:
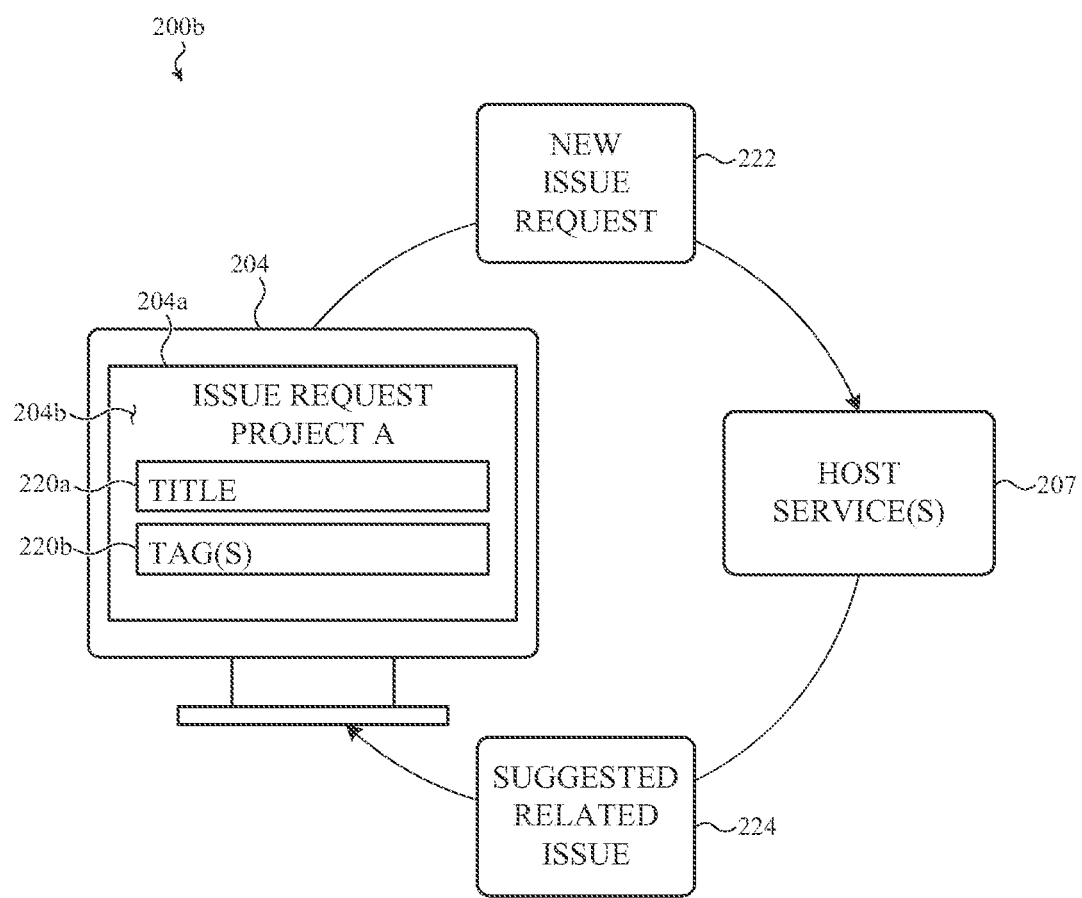
FIG. 2B is a signal flow diagram of an issue tracking system suggesting an issue, such as described herein.

For example FIG. 2B depicts an example signal flow diagram depicting communications between a client application operating on a client device and a host service of an issue tracking system, such as described herein. More specifically, as with the embodiment depicted in FIG. 2A, the issue tracking system 200b includes a host service 202 in communication with a client device 204. The client device 204 can execute an instance of a client application 204a. The client application 204a can render a graphical user interface 204b. The graphical user interface 204b can be used by a user to submit one or more issue requests (and/or to generate one or more issue records) to the host service 202. More specifically, the graphical user interface 204b can render one or more data entry fields, such as the data entry fields 220a, 220b illustrated in the figure, that can receive data entered by a user.

In one specific implementation of this example embodiment, a user can operate the graphical user interface 204b of the client application 204a to enter data into either or both of the data entry fields 220a, 220b to generate an issue request 222 for a specific project tracked by the issue tracking system 200b that can be submitted to the host service 202. In response to receiving the issue request 222, the host service 202—or, more precisely, a predictive model server or service of the host service 202 (see, e.g., FIG. 2A)—can perform one or more operations. For example, the host service 202 can determine whether the issue request 222 includes an extractable feature related to one or more relationship-signaling features and/or relationship-disqualifying features based on, without limitation: a title of the issue request 222 (e.g., keywords, semantic content, lemmatized content); a description of the issue request 222; a tag or group identifier of the issue request 222; and so on.

Thereafter or therewith, the host service 202 can optionally compare the content of the issue request 222 to other issues reported to the issue tracking system 200b that may, in turn, be related to still other issues.

In response to determining that the issue request 222 is likely related to at least one additional issue (e.g., via an output of a predictive model server) and/or in response to identifying one or more issues related to the issue request 222, the host service 202 can inform the client device 204 and, in particular, the client application 204a executed by the client device 204 that one or more additional issues, shown in the figure as the recommended issue 224 (also referred to herein as issue templates or issue seeds) may be relevant to the project associated with the issue request 222. More simply, the host service 202 can suggest to the user of the client device 204 that the user enter additional issues.

For example, in one embodiment, a user of the issue tracking system 200b may be a software developer working on a project related to a game application. In this example, the user may submit the issue request 222 to document a bug reported to that user that relates to a third-party API.

The host service 202 can ingest the issue request 222 and may extract one or more features from the content of the issue request 222. Such features can include keywords, normalized text or string content, and/or one or more topic models. Thereafter, the extracted content can be compared, by a predictive model server, to one or more relationship-signaling features and/or relationship-disqualifying features stored in a database accessible to the predictive model server. Based on the result of this comparison, the predictive model server can output a statistical value corresponding to a likelihood that the issue request 222 is associated with at least one additional related issue. For example, the keyword "third-party API" may be determined to be a relationship-signaling keyword.

In response to this determination—or more specifically, in response to the determined likelihood satisfying a confidence threshold—the host service 202 can provide a general recommendation, in the form of the recommended issue 224, to the user of the client application 204b to submit an additional issue. In many cases, the recommended issue 224 can be prepopulated with content extracted from the issue request 222. For example, the recommended issue 224 can have the same tags, categorization, project association, and so on as the issue request 222. In addition, the recommended issue 224 can be automatically linked to the issue request 222.

As a result of this configuration and construction, the user of the client application 204b may save substantial time when entering multiple issues, all related to one another, in sequence.

In further implementations of the preceding example, the host service 202 can be configured to populate additional information in the recommended issue 224. For example, as noted above, a predictive model server such as described herein can be configured to compare the issue request 222 to all or some issues previously received by the host service 202. In some cases, if it is determined that the issue request 222 is similar to a previously-received issue that is related to additional issues, the additional issues related to the identified issue can be suggested as the recommended issue 224.

Expanding the example provided above, the host service 202 can be further configured to compare the issue request 222 with all previously-received issue requests in the same project. The host service 202 may identify another issue related to the issue request 222 and the identified issue may be associated with five child issues, each of which is related by likency to the identified issue. In this example, the recommended issue 224 may be one of a group of five separate recommended issues, each including content prepopulated from content extracted from the issue request 222 (e.g., tags, categorization, and so on) and each including content prepopulated from the issues related to the identified issue (e.g., description, title, summary, priority, and so on).

The foregoing embodiments depicted in FIGS. 1-2B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although many embodiments reference a predictive model server configured to compare issues and issue content in order to determine a likelihood that a given issue is related to at least one additional issue, this may not be required. For example, a predictive model server may be further configured to determine patterns of issue reporting that can be leveraged to provide additional suggestions or recommendations to a user in the process of entering an issue request.

Figure 3:
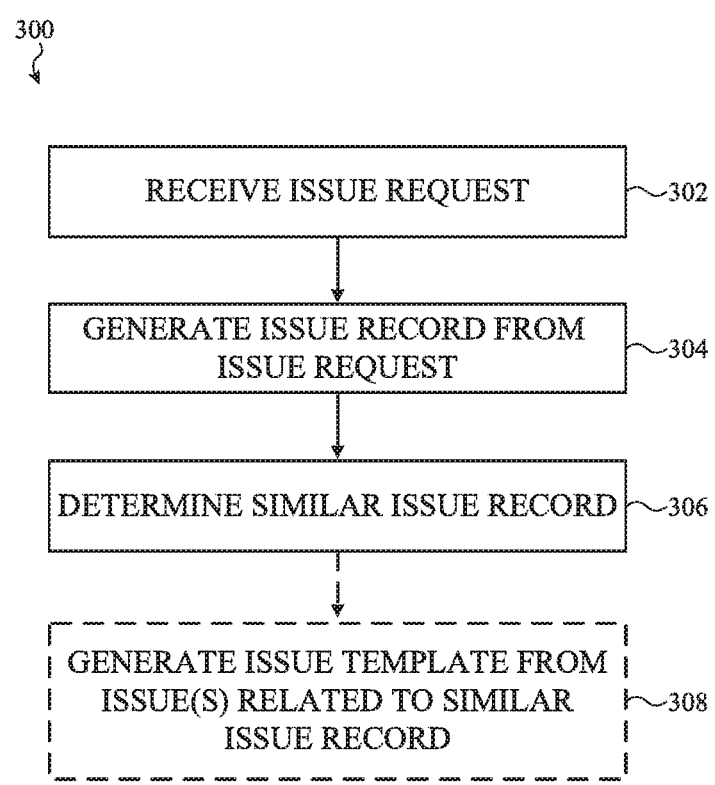
FIG. 3 is a flow chart that depicts example operations of a method of detecting similar issues in an issue tracking system, such as described herein.
Figure 4:
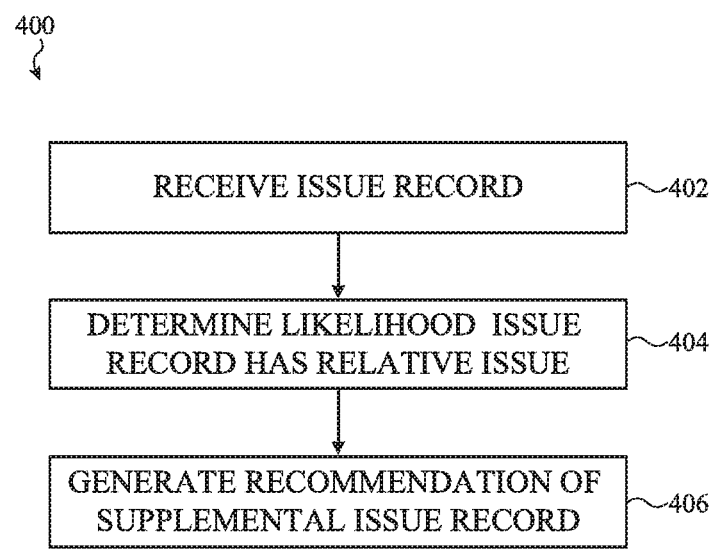
FIG. 4 is a flow chart that depicts example operations of another method of detecting similar or related issues in an issue tracking system, such as described herein.

Generally and broadly, FIGS. 3-4 depict flow charts corresponding to example simplified methods of operating a system, such as described herein.

FIG. 3 is a flow chart that depicts example operations of a method of detecting similar issues in an issue tracking system, such as described herein. The method 300 can be performed by any hardware or software, whether virtual or otherwise, such as described herein. In one example, the method 300 is performed, in whole or in part, by a predictive model server, such as described above.

The method 300 includes operation 302 in which an issue request—or a portion thereof—is received. As noted with respect to embodiments described herein, an issue request can be any suitable request and may take a number of forms and formats. In one embodiment, an issue request can take the form of a web-based form filled out by a user of an issue tracking system, such as described herein. The web-based form can include any suitable number of fields, data entry points, or other information. In other examples, the issue request can take the form of a formatted (e.g., JavaScript object notation or extensible markup language and the like) file transmitted from a client device or a client application to a host service, such as described above in reference to FIG. 1.

Regardless of form or format, it may be appreciated that an issue request can include any number of suitable data or information relating to the issue to be opened by the issue tracking system. Examples include, but are not limited to: an issue title; an issue description; an issue summary; an issue assignee; an issue reporter; an issue type; an issue category, cluster, or group; an indication of a projection to which the issue belongs; and so on. In some cases, the issue request may be complete, meaning that all possible data fields that can comprise an issue request are populated. In other cases, the issue request may be partially complete, including only certain data. In some cases, the issue request may be one of a series or set of issue requests that are being entered for a particular project or by a particular user.

Once the issue request or set of requests is submitted by a user, client application, or client device, the method continues at operation 304 in which an issue report, issue record, or set of issue records is generated in response to the issue request or set of issue requests. In some examples, although not required, the issue report or issue record can be stored in a database once created. In some cases, the issue request and/or the newly created issue record are added to the predictive model.

The method 300 also includes operation 306, in which other issues having a similar content can be determined. In some cases, a similarity is computed or determined between a first set of issue requests and a second set of issue records that have been previously stored in the system. In accordance with the embodiments described herein, operation 306 may be performed using a predictive model. In one example, the method may determine that the issue request exhibits a high semantic similarity or document similarity to another issue previously received by the issue tracking system. For example, a similarity score may be determined against some or all other issues—regardless or in view of groupings or project assignments of those issues—tracked by the issue tracking system. Thereafter, a related or seed issue may be identified and seed content may be extracted. The related or seed issue may have a dependency (implicit or explicit) with one or more parent issue records of a second set of issue records. In some cases, the most related issues to the issue reported at operation 302 can be sorted or otherwise ranked in order to determine which of those issues are most similar to the issue request of operation 302.

Optionally, at operation 308, one or more issue templates—which may be complete or only partially complete—can be generated and can be provided to a user as a suggestion for a subsequent data entry operation.

As one example, process 300 may be implemented on an issue tracking system, in accordance with the embodiments described herein. In particular, a client device may execute a client application, which is configured to produce and/or display a graphical user interface having one or more fields for receiving user input. The fields and/or the user input may pertain to an issue request being generated by a user. In some cases, the client application may be used to generate a set or series of issue requests that are related to a particular set of tasks or related issues to be tracked by the system. In response to receiving one or more of these issue requests, the system may use a predictive model to identify a seed issue record that may have seed content that is relevant to the one or more issue requests being entered by the user. In some cases, the seed issue record and/or content extracted therefrom, may be used to provide a suggested issue to the user. The suggested issue may include seed content and/or may include some content extracted from the issue request(s) being entered by the user. This may allow the system to reduce the amount of data entry performed by the user when relevant content or potentially related issues can be identified by the issue tracking system.

FIG. 4 is a flow chart that depicts example operations of another method of detecting similar or related issues in an issue tracking system, such as described herein. As with the embodiment described above in reference to FIG. 3, the method 400 can be performed in whole or in part by any hardware or software, whether virtual or otherwise, such as described herein. In one example, the method 400 is performed, in whole or in part, by a predictive model server, such as described above.

The method 400 includes operation 402 in which an issue report (e.g., an issue record or issue request) is received by a predictive model server, such as described herein. Next, at operation 404, the predictive model server determines whether the received issue report (e.g., an issue record or issue request) is likely to be related to at least one other issue. For example, the predictive model server may extract one or more features from content of the issue report and compare the extracted features to a database of one or more relationship-signaling features and/or relationship-disqualifying features. Thereafter, based on a relative proportion of relationship-signaling features to relationship-disqualifying features, the predictive model server can make a determination of whether the issue report is likely to be related to another issue (e.g., a seed issue) or not. In response to a determination that the issue report has sufficient relationship-signaling features to satisfy a threshold or criteria, the system may identify a seed issue record and extract seed issue content. This determination may be performed in accordance with any number of the previous examples described herein.

Finally, at operation 406 the method 400 generates a recommendation to a user to submit an additional or supplemental issue report (e.g., an issue request) based on the determination of operation 404. The recommendation, in some cases, may include seed content that has been extracted from one or more existing seed issue records that were found to have a sufficient likelihood of being relevant to the issue request or series of issue requests being entered by the user. In some cases, the extracted seed content and/or other content extracted from issue request being entered by the user may be transmitted to the user as a suggested issue request or template.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. An issue tracking system for receiving interrelated issue requests and suggesting subsequent requests based on a predictive model, the issue tracking system comprising:
    a client device executing a client application; and
    a host service communicably coupled to the client application of the client device over a network and comprising a processor configured to:
        receive from the client application a first set of multiple interrelated issue requests, wherein interrelations between the issue requests of the first set of multiple interrelated issues defined by a user of the issue tracking system;
        generate at least a first set of issue records in response to receiving the first set of multiple interrelated issue requests;
        extracting one or more features from an issue content of the first set of issue records;
        comparing the one or more features, by the predictive model, to one or more relationship-signaling and one or more relationship-disqualifying features stored by the host server, the one or more relationship-signaling features and the one or more relationship-disqualifying features being causally or logically interlinked to one another;
        based on a relative proportion of the one or more relationship-signaling features to the one or more relationship-disqualifying features, using the predictive model, determine a similarity score between the issue content of the first set of issue records and an issue content of a second set of issue records that are stored by the host service;
        in response to the similarity score satisfying a similarity threshold, access a database to identify one or more seed issue records that are related to each of the second set of issue records;
        extract seed content from the one or more seed issue records; and
        transmit a suggested issue request to the client application based, at least in part, on the seed content, the suggested issue request including a suggestion to define a relationship between the suggested issue request and at least one of the first set of multiple interrelated issue requests.

2. The issue tracking system of claim 1, wherein the processor is further configured to:

generate one or more issue request templates in response to identifying the one or more seed issue records;
populate the one or more issue request templates with the seed content extracted from the one or more seed issue records and first content from the first set of multiple first interrelated issue requests; and
transmit the one or more populated issue request templates to the client application.

3. The issue tracking system of claim 1, wherein:
the second set of issue records includes a parent issue; and
a seed issue record of the one or more seed issue records is a child issue that depends from the parent issue.

4. The issue tracking system of claim 1, wherein:
identifying the one or more seed issue records comprises determining a likelihood that the seed issue record includes data that is relevant to the first set of issue records.

5. The issue tracking system of claim 1, wherein:
the client device is a first client device of a group of client devices;
each client device of the group of client devices is coupled to the host service by the network; and
the second set of issue records is generated in response to interrelated issue requests transmitted from a second client device of the group of client devices.

6. The issue tracking system of claim 1, wherein determining the similarity score between the first set of issue records and the second set of issue records comprises at least one of:
determining a semantic similarity between a first issue description extracted from the first set of issue records and a second issue description extracted from the second set of issue records; or
determining that the first set of issue records and the second set of issue records share one or more issue tags or categories.

7. The issue tracking system of claim 1, wherein the seed content extracted from the one or more seed issue records comprises at least one of:
an issue category;
an issue assignee;
an issue reporter; or
an issue priority.

8. A method for operating an issue tracking system to suggest one or more issues to a client application on a client device that is communicably coupled to the issue tracking system, the method comprising:
generating a first set of issue records in response to receiving a first set of interrelated issue requests from the client application, wherein interrelations between the first set of interrelated issue requests defined by a user of the issue tracking system;
extracting one or more features from an issue content of the first set of issue records;
comparing the one or more features, by a predictive model, to one or more relationship-signaling features and one or more relationship-disqualifying features that are causally or logically interlinked to one another;
accessing a database to identify a second set of issue records that have an issue content similar to the issue content of the first set of interrelated issue requests, using a similarity score based on a relative proportion of the one or more relationship-signaling features to the one or more relationship-disqualifying features;
identifying a seed issue record related to each issue record of the second set of issue records and extracting seed content from the seed issue record;
generating one or more issue request templates in response to identifying the seed issue record;
populating the one or more issue request templates with the extracted seed content to produce one or more populated issue request templates;
transmitting the one or more populated issue request templates to the client application; and
causing a display of data from the one or more populated issue request templates within the client application on the client device.

9. The method of claim 8, wherein:
the first set of interrelated issue requests is associated with a project; and
identifying the seed issue record comprises determining a likelihood that the seed issue record is relevant to the project.

10. The method of claim 8, wherein identifying the second set of issue records comprises:
determining a similarity score between the first set of issue records and a parent issue record stored in the database, wherein:
the seed issue record is a child of the parent issue record stored in the database.

11. The method of claim 10, wherein determining the similarity score between the first set of issue records and the parent issue record comprises at least one of:
determining a semantic similarity between a first issue description extracted from the first set of issue records and a second issue description of the parent issue record; or
determining that the first set of issue records and the parent issue record share one or more issue tags or categories.

12. The method of claim 8, further comprising populating the one or more issue request templates with the seed content extracted from the first set of interrelated issue requests.

13. The method of claim 8, wherein:
the client application is configured to receive an acceptance from a user of the one or more populated issue request templates; and
the client application is configured to transmit one or more subsequent interrelated issue requests that are based on the one or more populated issue request templates.

14. The method of claim 8, wherein issue records of the first set of issue records comprise:
an issue category;
an issue assignee;
an issue reporter; and
an issue description.

15. An issue tracking system for suggesting one or more issues to a client application on a client device that is communicably coupled to the issue tracking system, the issue tracking system comprising:
a host service; and
a database communicably coupled to the host service;
wherein the host service is configured to:
generate a first issue record in response to receiving an issue request from the client application on the client device, the first issue record related to at least one other issue request;
extract one or more features from an issue content of the first set of issue records;
compare the one or more features, by a predictive model, to one or more relationship-signaling features and one or more relationship-disqualifying features that are stored by the host service, the one or more relationship-signaling features and the one or more relationship-disqualifying features being causally or logically interlinked to one another;

identify a second issue record having an issue content that exhibits a similarity score relative to the issue content of the first issue record that satisfies a threshold, the similarity score determined using the predictive model based on a relative proportion of the one or more relationship-signaling features to the one or more relationship-disqualifying features;

access the database to identify a third issue record having a dependency relationship with the second issue record, the second issue record being dependent on the third issue record;

generate an issue request template from the third issue record;

populate the issue request template with data extracted from one of the first issue record and the third issue record; and transmit the populated issue request template to the client application as a suggested issue record upon which the first issue record depends.

16. The issue tracking system of claim 15, wherein:
the client application is configured to display the populated issue request template;
the client application is configured to receive additional issue data from a user to complete the populated issue request template; and
the client application is configured to generate a subsequent issue request based on the completed populated issue request template.

17. The issue tracking system of claim 16, wherein the host service is configured to modify the threshold in response to receiving the subsequent issue request.

18. The issue tracking system of claim 15, wherein:
the first issue record is associated with a first project; and
identifying the third issue record comprises determining a likelihood that the third issue record includes data that is relevant to the project.

19. The issue tracking system of claim 15, wherein the similarity score is determined based on a semantic similarity between a first issue description of the first issue record and a second issue description of the second issue record.

20. The issue tracking system of claim 15, wherein the similarity score is based on a determination that the first issue record and the second issue record share one or more issue tags or categories.

* * * * *